(12) United States Patent
Dumas et al.

(10) Patent No.: US 10,908,296 B2
(45) Date of Patent: Feb. 2, 2021

(54) METHOD FOR CALCULATING A SPEED OF AN AIRCRAFT, METHOD FOR CALCULATING A PROTECTION RADIUS, POSITIONING SYSTEM AND ASSOCIATED AIRCRAFT

(71) Applicant: THALES, Courbevoie (FR)

(72) Inventors: Pierre-Yves Dumas, Valence (FR); Christian Mehlen, Valence (FR); Jacques Coatantiec, Valence (FR)

(73) Assignee: Thales, Courbevoie (FR)

( * ) Notice: Subject to any disclaimer, the term of this patent is extended or adjusted under 35 U.S.C. 154(b) by 100 days.

(21) Appl. No.: 15/927,838

(22) Filed: Mar. 21, 2018

(65) Prior Publication Data
US 2018/0275283 A1   Sep. 27, 2018

(30) Foreign Application Priority Data

Mar. 23, 2017   (FR) .................................. 17 00303

(51) Int. Cl.
  *G01S 19/40*   (2010.01)
  *G01S 19/47*   (2010.01)
  (Continued)

(52) U.S. Cl.
  CPC ............ *G01S 19/40* (2013.01); *G01C 21/165* (2013.01); *G01C 21/20* (2013.01); *G01P 7/00* (2013.01);
  (Continued)

(58) Field of Classification Search
  CPC ...................................................... G01S 19/40
  See application file for complete search history.

(56) References Cited

U.S. PATENT DOCUMENTS

| 7,579,984 B2 * | 8/2009 | Wang ................. | G01C 21/165 342/357.59 |
| 7,711,482 B2 * | 5/2010 | Coatantiec ........... | G01C 21/165 342/357.31 |

(Continued)

FOREIGN PATENT DOCUMENTS

| EP | 3018447 A1 | 5/2016 |
| WO | WO 03029755 A1 | 4/2003 |

OTHER PUBLICATIONS

Search Report and Written Opinion dated Nov. 10, 2017, in French Patent Application 17 00303 which is the priority application for the subject application.

*Primary Examiner* — Michael A Berns
(74) *Attorney, Agent, or Firm* — Knobbe, Martens, Olson & Bear, LLP

(57) ABSTRACT

A method of calculating a speed of an aircraft, a method for calculating a protection radius, a positioning system and an associated aircraft are disclosed. In one aspect, the method includes obtaining a measured speed of the aircraft and obtaining a measured position of the aircraft, associated with a reliability protection radius related to position. The method also includes calculating, by a correction loop, a corrected speed, wherein the calculation of the corrected speed includes calculating a calculated position by integration of the corrected speed, and correcting the measured speed as a function of a difference between the calculated position and the measured position. The method further comprising calculating a reliability protection radius related to the corrected speed.

10 Claims, 3 Drawing Sheets

(51) Int. Cl.
*G01C 21/20* (2006.01)
*G01C 21/16* (2006.01)
*G01S 19/20* (2010.01)
*G01P 7/00* (2006.01)
*G01S 19/52* (2010.01)

(52) U.S. Cl.
CPC .............. *G01S 19/20* (2013.01); *G01S 19/47* (2013.01); *G01S 19/52* (2013.01)

(56) References Cited

U.S. PATENT DOCUMENTS

| | | | |
|---|---|---|---|
| 8,094,066 B2 * | 1/2012 | Mizuochi | G01S 19/52 |
| | | | 342/357.28 |
| 9,182,497 B2 * | 11/2015 | Geier | G01S 19/49 |
| 9,341,718 B2 * | 5/2016 | Vanderwerf | G01S 19/20 |
| 2010/0026567 A1 | 2/2010 | Coatantiec et al. | |
| 2014/0074397 A1 | 3/2014 | Vanderwerf | |

* cited by examiner

| | |
|---|---|
| LEGEND | |
| 15 | INERTIAL MEASUREMENT UNIT |
| 20 | SATELLITE GEOLOCATION MODULE |
| 25 | CALCULATOR |
| 30 | CORRECTION MODULE |
| 40 | FIRST CALCULATION MODULE |
| 45 | SECOND CALCULATION MODULE |
| 50 | CORRECTION LOOP |
| 55 | THIRD CALCULATION MODULE |
| 60 | FIRST COMPARATOR |
| 65 | FIRST INTEGRATOR |
| 70 | SECOND COMPARATOR |
| 75 | SECOND INTEGRATOR |
| 80 | THIRD COMPARATOR |
| 85 | FIRST MULTIPLIER |
| 90 | SECOND MULTIPLIER |

METHOD FOR CALCULATING A SPEED OF AN AIRCRAFT, METHOD FOR CALCULATING A PROTECTION RADIUS, POSITIONING SYSTEM AND ASSOCIATED AIRCRAFT

CROSS-REFERENCE TO RELATED APPLICATIONS

This patent application claims the benefit under 35 U.S.C. § 119 of French Application No. FR 17 00303 filed on Mar. 23, 2017 which is hereby incorporated by reference in its entirety.

BACKGROUND

Technological Field

The described technology relates to a method for calculating a speed of an aircraft and, in particular, to a method for calculating a reliable speed that is protected against possible failures of a satellite positioning system or Global Navigation Satellite System (GNSS), a positioning system and an associated aircraft.

Description of the Related Technology

Aircraft are frequently equipped with sophisticated flight control systems in which many functions are controlled by automatic systems or synthetic display systems in which a three-dimensional representation of the environment and information on the speed of the aircraft are displayed.

Such systems assume a very good knowledge of the speed and position of the aircraft to ensure the safety of the aircraft and its passengers. In particular, these measurements must not only be accurate, but also reliable.

A measurement is said to be "accurate" if the difference between the measured quantity and the actual quantity is less than a first predefined threshold.

A measurement is said to be "reliable" if it is possible to calculate a probability that the measurement error is greater than a second determined threshold, taking into account the possible causes of failures. For example, a reliability of $10^{-5}$ or less per hour is frequently required for speed measurements of an aircraft.

The second threshold is frequently called the "protection radius." When the measurement error is a vector having components in the horizontal and vertical axes, such as, for example, a position error vector or a speed error vector, it is possible to associate a horizontal protection radius and a vertical protection radius with this measurement. When the protection radius relates to the position, an associated protective volume is frequently defined by the horizontal protection radius and the vertical protection radius.

Speed calculation methods based either on the use of Doppler measurements of a carrier wave or on the derivation of the position obtained by the pseudo-code distance measurements given by a satellite positioning system, such as the Global Positioning System (GPS) are known.

However, the GPS system (ground stations, satellites in orbit) provides a reliability commitment related to a measured position, but not to the temporal variation of this position, whether it is obtained in one way or another. In fact, the notion of a failure affecting the GPS position is well defined and quantified, while the concept of a failure affecting the GPS speed is not. It is therefore possible that the position error may remain within its protection volume, but may vary rapidly within this volume. This results in a large speed error even in cases where the position remains within its protection volume.

Document US 2014/0074397 A1 discloses a method for calculating a reliable speed using a satellite positioning system coupled with inertial measurements. However, this method is complex and requires significant resources in terms of calculations, since the horizontal and vertical protection radii are obtained by the use of a Kalman filter. Such a method cannot be incorporated in avionic systems having limited calculating capabilities.

SUMMARY OF CERTAIN INVENTIVE ASPECTS

One of the objects of the described technology is to propose a method of calculating a speed of an aircraft that is reliable and accurate, while requiring less calculating power than the prior art methods.

To this end, one aspect of the described technology is a method for calculating a reliable speed of an aircraft related to the failures of a satellite positioning system, comprising:

obtaining a measured speed of the aircraft from an inertial measurement unit of the aircraft, obtaining a measured position of the aircraft associated with a reliable position protection radius, from a satellite positioning module of the aircraft, calculation, by a correction loop, of a corrected speed, the calculation of the corrected speed including the calculation of a calculated position by integration of the corrected speed, and the correction of the measured speed as a function of a difference between the calculated position and the measured position, calculation of a reliable protection radius related to the corrected speed that is equal to the sum of a contribution of the worst variation of the position error measured within a protection volume defined by the reliable position protection radius, and a contribution of the imperfections of the inertial measurement unit.

The calculation method optionally comprises one or more of the following features, taken individually or in any technically feasible combination:

the method further comprises:

the measurement, by the inertial measurement unit, of at least one acceleration of the aircraft in a reference frame linked to the aircraft, the projection of each acceleration measured in a geographic reference frame to obtain at least one projected acceleration, wherein the projection is, furthermore, a function of an acceleration due to gravity, and the integration of the projected acceleration to obtain the measured speed.

the calculation of a corrected speed comprises:

the correction of the projected acceleration by an amount equal to the product between a gain, called the second gain, and the position difference, and the correction of the measured speed by an amount equal to the product between a first gain and the position difference.

the first gain and the second gain are constant, the reliable protection radius related to the corrected speed is equal to the sum of a ratio of double the protection radius related to the reliable position measured over a time constant of the correction loop, and a first function of the maximum error of the projected acceleration, the first function of the maximum error of the projected acceleration is equal to the sum of a second function and a product, wherein the second function is a function of a dynamic of the trajectory of the aircraft, while the product is a product of a maximum error of the projected acceleration and the time constant.

the time constant is equal to the square root of the ratio between, for the numerator, the protection radius related to the reliability of the measured position and, for the denominator, the maximum error of the projected acceleration.

Another aspect is a positioning system comprising an inertial measurement unit, a satellite geolocation module and a calculator, wherein the calculator is configured to implement a method for calculating a reliable speed as previously described.

Yet another aspect is an aircraft equipped with a positioning system as previously described.

BRIEF DESCRIPTION OF THE DRAWINGS

The described technology and its advantages will be better understood upon reading the description which follows, given solely by way of a non-limiting example and with reference to the appended drawings, wherein.

DETAILED DESCRIPTION OF CERTAIN INVENTIVE EMBODIMENTS

Figure 1:
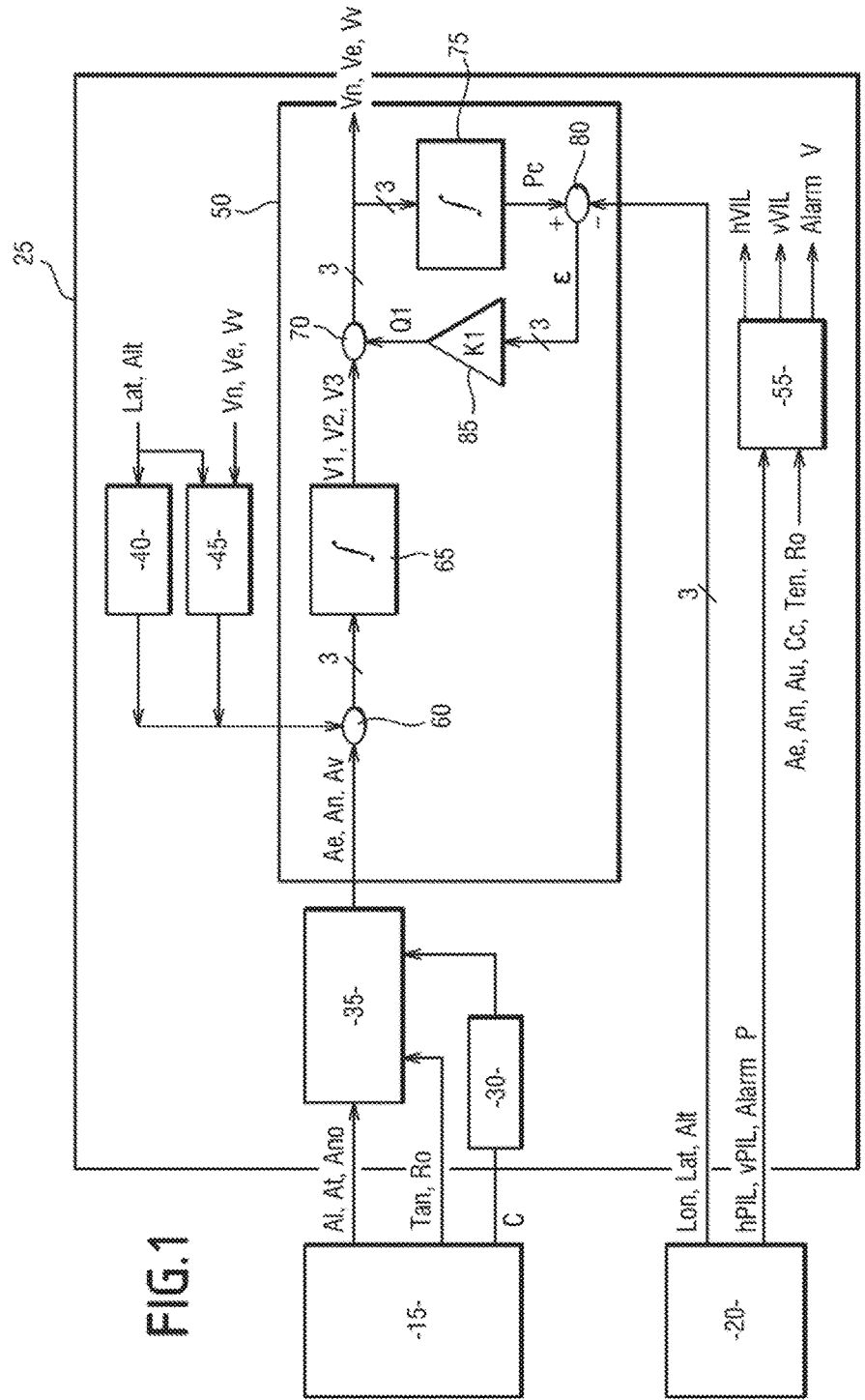
FIG. 1 shows a schematic representation of an exemplary positioning system.

A first example of a positioning system 10 of an aircraft is shown in FIG. 1.

The electronic positioning system 10 is configured to estimate at least one measured position Pm and a speed of the aircraft, called the corrected speed. In the following, the corrected speed will also be called "reliable speed."

For example, the positioning system 10 is able to estimate the position and the speed of the aircraft in a geographical reference frame. In particular, the positioning system 10 is able to estimate a speed vector V of the aircraft.

"Local geographical reference frame" is understood to mean a reference frame comprising an origin and three axes. The axes of the reference frame are fixed with respect to geographical directions. For example, the directions "North-South," "East-West," and the vertical direction associated with an origin which is the current position of the aircraft, form a local geographic reference frame.

In certain embodiments, the measured position Pm comprises a vector having a latitude Lat, a longitude Lon and an altitude Alt. Alternatively, the measured position Pm may comprise Cartesian coordinates in an Earth-Centered Earth-fixed (ECEF) reference frame. An ECEF reference frame is a reference frame whose origin is the center of the Earth and the directions are fixed with respect to the surface of the Earth.

The term "speed vector" is understood to mean a vector comprising three velocity coordinates, wherein each is defined in one direction of the geographical reference frame. For example, the speed vector comprises a vertical speed Vv and two horizontal speeds Ve and Vn.

The vertical speed Vv is also called the "vertical component."

A vector having the two horizontal speeds Ve and Vn as coordinates is called the "horizontal component" of the velocity.

It should be noted that the speed vector is likely to be expressed in spherical coordinates. In this case, the speed vector comprises an amplitude and two angles. The amplitude is a norm of speed in the reference frame. Each angle is an angle between the speed vector and a direction of the geographic reference frame. For example, one angle is the angle between the velocity vector and the north, also called "drift angle."

The transition from one representation to another for the speed vector is obtained by a known geometric conversion.

The positioning system 10 is further configured to calculate at least one reliable protection radius. A reliability protection radius is also known by the acronym IPL (Integrity Protection Limit).

"Reliability protection radius" or "integrity protection radius" associated with a calculated or measured magnitude, when the calculated or measured magnitude is an estimate of a real magnitude, is understood to mean a value such as the probability that the difference, in absolute value, between the measured or calculated magnitude and the actual magnitude is greater than or equal to the reliability protection radius, without an alarm being transmitted, is less than or equal to a predetermined threshold.

The predetermined threshold is then called the "probability of hazardously misleading information." The predetermined threshold is expressed, for example, in hours$^{-1}$.

Thus, while the accuracy limits the error to normal events, or normal and rare events, the reliability protection radius defines an upper limit of the error with respect to abnormal events such as failures.

The concepts of "normal," "normal and rare" and "abnormal" as used in this description are defined in paragraph 2.1.1 of Annex R of the RTCA DO-229 aeronautical standard issued by the Radio Technical Commission for Aeronautics.

The reliability protection radius associated with a magnitude is expressed in the same unit of measurement as this magnitude. For example, a reliability protection radius associated with a speed is expressed in meters per second.

When the measured speed is reliable, the probability that the difference between the actual speed and the measured speed is greater than or equal to the reliability protection radius associated with the measured speed, without an alarm being transmitted, taking into account all possible failures of the constituents of the positioning system, is less than or equal to a predetermined threshold, which is the probability of non-reliability. The probability of such a failure is generally noted as "$10^{-x}$ per hour."

The positioning system 10 is designed to calculate at least one reliability protection radius related to the speed of the aircraft. The positioning system 10 is further designed to transmit a speed reliability alarm AlarmV.

More specifically, the positioning system 10 is designed to calculate at least one protection radius hVIL related to the horizontal component of the speed, and a protection radius vVIL related to the vertical component of the speed.

The probability that the horizontal velocity error is greater than the horizontal protection radius hVIL related to the speed, without the AlarmV speed reliability alarm being transmitted, is smaller than the probability of non-reliability.

The probability that the vertical speed error is greater than the vertical protection radius vVIL related to the speed, without the AlarmV speed reliability alarm being transmitted, is smaller than the probability of non-reliability.

The positioning system 10 comprises an inertial measurement unit 15, a satellite geolocation module 20 and a calculator 25.

The inertial measurement unit 15 is configured to measure inertial parameters such as accelerations, angles or angular velocities. The inertial measurement unit 15 comprises accelerometers and gyrometers.

In particular, the inertial measurement unit 15 is designed to measure at least one acceleration in a reference frame associated with the aircraft.

"Reference frame associated with the aircraft" is understood to mean a reference frame comprising a longitudinal direction (also called "roll axis"), a transverse direction (also called "pitch axis") and a normal direction (also called "yaw axis"). The roll, pitch and yaw axes are axes that are commonly used in the field of aeronautics. In particular, the inertial measurement unit 15 is designed to measure three accelerations in three directions of the reference frame associated with the aircraft.

According to the example of FIG. 1, the inertial measurement unit 15 is designed to measure an acceleration Al of the aircraft in the longitudinal direction, an acceleration At in the first transverse direction, and an acceleration Ano in the normal direction.

The inertial measurement unit 15 is able to operate in a "linked-component" mode (also known as a "strapdown" mode). The strapdown mode is a mode in which the components of the inertial measurement unit 15 are fixed relative to the aircraft and not mounted on gimbals compensating for the rotation of the aircraft.

The inertial measurement unit 15 is also designed to measure at least one orientation angle with respect to the geographic reference frame. In particular, the inertial measurement unit 15 is designed to measure three orientation angles with respect to the local geographic reference frame "Three angles of orientation" is understood to mean the three Euler angles. Euler angles are defined as the angles of 3 successive rotations to align the aircraft-related reference frame with the local geographic reference frame. Euler angles include the heading C, roll Ro and pitch Tan. The heading C is, for example, a magnetic heading defined relative to the direction of the magnetic North Pole.

It should be noted that other representations of the orientation, such as the guiding quaternions cosine, are possible if these representations make it possible to calculate a transition matrix from the reference frame linking the aircraft to the geographical reference frame.

For example, the inertial measurement unit 15 comprises an Altitude and Heading Reference System (AHRS) module comprising accelerometers, gyrometers, magnetometers, and is suitable for measuring angles of roll Ro, pitch Tan, and a magnetic heading angle C. The AHRS modules are generally less efficient than the Inertial Reference System (IRS) modules during the dynamic flight phases of the aircraft.

The geolocation satellite module 20 is designed to measure a position Pm of the aircraft by the use of radio signals transmitted by satellites from a satellite constellation of a satellite positioning system. The geolocation satellite module 20 is also called "radionavigation receiver," or "satellite positioning receiver," "GNSS module" or "GNSS positioning module" (according to the acronym GNSS, for "Global Navigation Satellite System"). The position Pm measured by the satellite geolocation module 20 is also called "GNSS position."

For example, the geolocation satellite module 20 is a satellite positioning module of the Global Positioning System (GPS). Alternatively, it may be a satellite positioning module of a GNSS system that is different from the GPS system, for example GALILEO, BEIDOU or GLONASS.

According to one embodiment, the satellite geolocation module 20 is compatible with a Satellite-Based Augmentation System (SBAS). A satellite-based augmentation system is complementary to GNSS systems and increases the accuracy of these systems. SBAS systems have been developed by various government agencies under the names "EGNOS" in Europe, "MTSAT" or "MSAS" in Japan, or "WAAS" in the United States of America.

The satellite geolocation module 20 is further able to calculate at least one reliability protection radius of the aircraft measured position Pm, associated with a position alarm signal AlarmP. For example, the satellite geolocation module 20 is able to calculate an reliability horizontal protection radius hPIL, and a reliability vertical protection radius vPIL of the measured position Pm.

The satellite geolocation module 20 is designed to transmit the position alarm signal AlarmP when the protection radii hPIL and vPIL of the position no longer limit the measurement error of the measured position Pm.

Known reliability techniques take into account the possible failures of the various types of GNSS systems in question, for example Aircraft Based Augmentation Systems (ABAS) techniques of the Receiver Autonomous Integrity Monitoring (ABAS) type, or SBAS techniques.

The horizontal protection radius hPIL and vertical protection radius vPIL of the measured position Pm are calculated by the geolocation satellite module 20 taking into account the failures of the GNSS system.

The probability that the horizontal GNSS position error is greater than the horizontal protection radius hPIL related to the position, without the position reliability alarm AlarmP being transmitted, is less than the probability of non-reliability of the position.

The probability that the vertical GNSS position error is greater than the vertical protection radius vPIL related to the position, without the position reliability alarm AlarmP being transmitted, is less than the probability of non-reliability of the position.

In particular, the horizontal hPIL and vertical vPIL protection radii of the position are calculated taking into account the normal, normal and rare, and abnormal events that may affect the relevant GNSS system and the satellite geolocation module 20.

The calculator 25 is designed to estimate at least one speed Vv, Vn, Ve of the aircraft.

The calculator 25 is further designed to calculate at least one reliability protection radius hVIL, vVIL associated with a speed of the aircraft, and to control the transmission of the AlarmV speed reliability alarm signal.

In certain embodiments, the calculator 25 is configured to estimate a reliability protection radius hVIL for the horizontal component of the speed of the aircraft, and a reliability protection radius vVIL for the vertical component of the speed of the aircraft.

The calculator 25 comprises a correction module 30, a projection module 35, a first calculation module 40, a second calculation module 45, a correction loop 50, also called a corrector or smoother, and a third calculation module 55.

The calculator 25 is, for example, a calculator having a memory and a processor capable of executing program instructions of a calculator program product stored in the memory. The correction module 30, the projection module 35, the first, second and third calculation modules 40, 45 and 55 and the correction loop 50 are provided in the form of program instructions that are executable by the processor of the calculator.

Alternatively, at least one of the projection correction modules 30, the first, second and third calculation modules 40, 45 and 55 and/or the correction loop 50, are implemented in the form of dedicated integrated circuits and/or programmable logic circuits.

The correction module 30 is designed to calculate a geographical heading, also called a "corrected heading" Cc, from the magnetic heading measured by the inertial measurement unit 15. For example, the corrected heading Cc is the angle between the roll axis projected on the horizontal and the direction of the North projected on the horizontal.

For example, the correction module 30 comprises magnetic declination tables and is able to calculate the corrected heading Cc from the magnetic declination tables according to an interpolation algorithm.

The projection module 35 is designed to calculate at least one acceleration of the aircraft in the geographical reference frame. For example, the projection module 35 is configured to calculate an acceleration An of the aircraft in the North-South direction, an acceleration Ae of the aircraft in the East-West direction and an acceleration Av of the aircraft in the vertical direction from the Al, At, Ano accelerations, roll angle Ro and pitch angle Tan, and the geographical heading angle Cc.

The first calculation module 40 is designed to calculate an acceleration g due to gravity. For example, the first calculation module 40 is able to calculate the gravitational acceleration g from the latitude Lat and the altitude Alt provided by the satellite geolocation module 20.

The second calculation module 45 is configured to calculate a Coriolis acceleration Ac from the latitude Lat and altitude Alt provided by the satellite geolocation module 20 and the speed Vn, Vv, Ve of the aircraft.

The correction loop 50 is designed to calculate a speed Vn, Vv, Ve of the aircraft from at least one acceleration An, Ae, Av in the geographical reference frame.

According to the example of FIG. 1, the correction loop 50 is configured to calculate three components of the speed vector V of the aircraft.

The correction loop 50 comprises a first comparator 60, a first integrator 65, a second comparator 70, a second integrator 75, a third comparator 80 and a first multiplier 85.

The third calculation module 55 is configured to calculate at least one reliability protection radius hVIL, vVIL related to a speed Vn, Vv, Ve of the aircraft. For example, the third calculation module 55 is designed to calculate a reliability protection radius hVIL of the horizontal component of the speed of the aircraft, and a reliability protection radius vVIL related to the vertical speed of the aircraft.

Figure 2:
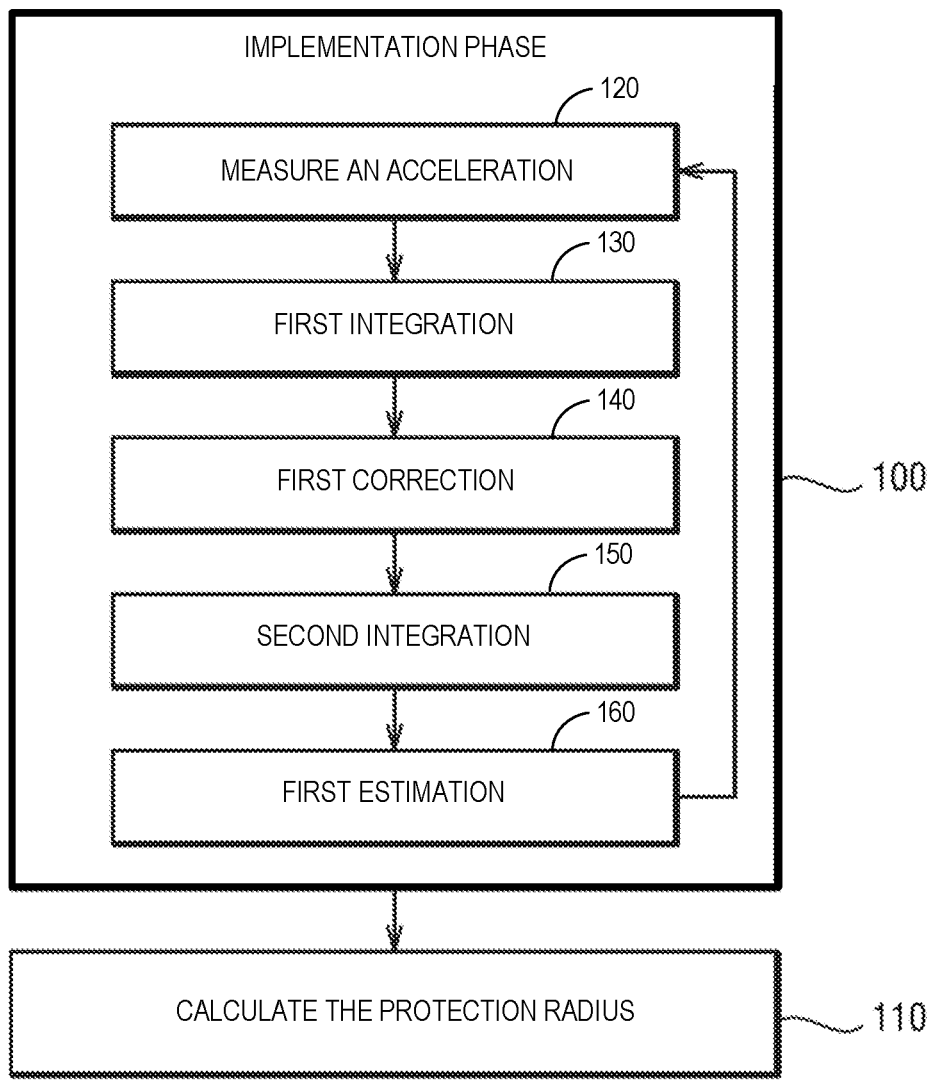
FIG. 2 shows a flow chart of the steps of a method for calculating a protection radius implemented by the positioning system of FIG. 1.

The operation of the positioning system will now be described with reference to FIG. 2, which represents a flow chart of the steps of a method for calculating a reliability protection radius hVIL, vVIL related to a speed of the aircraft.

The method for calculating a reliable speed comprises a phase 100 for implementing a method for calculating a reliable speed of the aircraft and a step 110 for calculating the protection radius hVIL, vVIL.

The implementation phase 100 of a method for calculating a speed of the aircraft comprises a step 120 for measuring an acceleration, a first integration step 130, a first correction step 140, a second integration step 150 and a first estimation step 160.

During the measuring step 120, the acceleration Al in the longitudinal direction, the acceleration At in the transverse direction and the acceleration Ano in the normal direction, are measured by the inertial measurement unit 15. The pitch Tan, the rolling Ro and the heading C are also measured by the inertial measurement unit 15.

The corrected heading Cc is calculated from the magnetic heading C by the correction module 30.

The measured accelerations Al, At, Ano are projected by the projection module 35 in the geographic reference frame to obtain at least one projected acceleration Ae, An, Av. According to the example of FIG. 1, the projected acceleration Ae in the North-South direction, the projected acceleration Ae in the East-West direction and the projected acceleration Av in the vertical direction are calculated.

It should be noted that a maximum error $\delta_{acc}$ is defined to limit the projected acceleration.

In particular, a maximum error $\delta_{acch}$ is defined for the accelerations Ae, An in horizontal directions and a maximum error $\delta_{accv}$ is defined for the acceleration Av in the vertical direction.

Thus, the maximum error $\delta_{acch}$ limits the projected acceleration error in the horizontal, while the maximum error $\delta_{accv}$ limits the projected acceleration error in the vertical.

The maximum error $\delta_{acc}$ of the projected acceleration reflects, in particular, the contribution of the measurement errors of the acceleration measured by the inertial measurement unit 15 and the projection errors.

In addition, the measured position Pm of the aircraft is measured by the satellite geolocation module 20.

During the first integration step 130, at least one acceleration Ae, An, Av in the geographical reference frame is integrated by the first integrator 65 to obtain a measured speed V1, V2, V3 of the aircraft in a direction according to the geographical reference frame.

According to the example of FIG. 1, during the first integration step 130, the speed V1 measured in the North-South direction, the speed V2 measured in the East-West direction and the speed V3 measured in the vertical direction, are calculated.

For example, as the accelerations Al, At1, At2 measured by the inertial measurement unit 15 are defined in the reference frame linked to the aircraft, the measured speeds V1, V2, V3 are each obtained from the corresponding projected acceleration Ae, An, Av, from the acceleration due to gravity g calculated by the first calculation module 40 and from the Coriolis acceleration Ac calculated by the second calculation module 45.

For example, each projected acceleration Ae, An, Av is corrected by the first comparator 60 as a function of the calculated Coriolis acceleration Ac and the calculated acceleration due to gravity g.

Each measured speed V1, V2, V3 is then obtained by integration, after correction, of the corresponding projected acceleration Ae, An, Av.

In the first correction step 140, at least one corrected speed Vv, Vn, Ve is calculated. More precisely, a corrected speed Vn in the North-South direction, a corrected speed Ve in the East-West direction, and a corrected speed Vv in the vertical direction, are calculated.

Each corrected speed Vv, Vn, Ve is obtained by correcting the corresponding measured speed V1, V2, V3 by a first-order corrector. The first order corrector is here formed by the second comparator 70, the second integrator 75, the third comparator 80 and the first multiplier 85.

In particular, each corrected speed Vv, Vn, Ve obtained by adding a first quantity Q1 to the corresponding measured speed by the second comparator 70.

During the second integration step 150, each corrected speed Vv, Vn, Ve is integrated by the second integrator 75 to obtain a calculated position Pc.

In the estimation step 160, a difference ε between the position Pm measured by the satellite positioning module 20 and the calculated position Pc is estimated by the third comparator 80.

The first quantity Q1 is also estimated by the first multiplier 85. The first quantity Q1 is equal to the product of the distance ε and a first gain K1. Thus, the measured speed V1, V2, V3 is corrected as a function of the distance ε.

The first gain K1 is constant.

A time constant Tau is defined for the first-order corrector of the correction loop 50. The time constant Tau is equal to the inverse of the first gain K1. This is written mathematically:

$$\text{Tau}=1/K_1 \quad \text{(equation 1)}$$

The estimation step 160 is followed by the calculation step 110 of the reliability protection radius vVIL, hVIL.

The acceleration measuring step 120, the first integration step 130, the first correction step 140, the second integration step 150 and the first estimation step 160 are repeated in this order with a time period. P. The time period is, for example, equal to 20 Hertz (Hz).

During the calculation step 110, the satellite geolocation module 20 calculates at least one reliability protection radius hPIL, vPIL related to the position. More precisely, the satellite geolocation module 20 calculates a horizontal reliability protection radius hPIL and a vertical reliability protection radius vPIL.

Each reliability protection radius hVIL, vVIL associated with the corrected speed Vn, Ve, Vv, is then calculated as a function of a reliability protection radius hPIL, vPIL related to the position Pm provided by the satellite geolocation module 20 and the maximum acceleration error $\delta_{acc}$ from the inertial measurement unit 15.

Each reliability protection radius hVIL, vVIL related to the speed is calculated by analytical calculation.

"Analytical calculation" is understood to mean that each reliability protection radius hVIL, vVIL related to the speed is calculated according to a mathematical formula as a function of values available at a given instant. In particular, the result of an analytical calculation is not obtained by integrating magnitudes as a function of time, or from an estimate as a function of past values.

Each reliability protection radius hVIL, vVIL related to the corrected speed is equal to the sum of the contribution of the worst variation of the position error Pm within the protection volume defined by the protection radii hPIL and vPIL related to the position, and the contribution of the imperfections of the inertial measurement unit 15.

The contribution of the worst variation of the position error, when this variation is propagated through the correction loop 50, related to the time constant Tau, is equal to a ratio, called the first ratio, of a reliability protection radius of hPIL, vPIL related to the measured position Pm, multiplied by 2, over the time constant Tau.

The contribution of the imperfections of the inertial measurement unit is represented by a function, called the first function $VIL_{inertiel}$. Thus, each velocity protection radius hVIL, vVIL is consistent with the equation:

$$VIL = \frac{2 \times PIL}{Tau} + VIL_{inertiel} \quad \text{(equation 2)}$$

where VIL is the protection radius hVIL, vVIL related to the calculated speed, PIL is the protection radius hPIL, vPIL related to the corresponding position and Tau is the time constant of the correction loop 50.

In order to take into account the inertial contribution due to the maximum error of acceleration projected and integrated during the time constant Tau during a stabilized flight phase, the first function $VIL_{inertiel}$ complies with the equation:

$$VIL_{inertiel} = \delta_{acc} \times \text{Tau} \quad \text{(equation 3)}$$

where $\delta_{acc}$ is the maximum error of the projected acceleration measurement, which reflects the contribution of acceleration measurement errors by the inertial measurement unit 15, and projection errors during a stabilized flight phase.

"Stabilized flight phase" is understood to mean a period during which the aircraft is almost in translation at constant speed.

The $\delta_{acc}$ function is defined differently for calculating a protection radius hVIL for horizontal speed and for calculating a protection radius vVIL for vertical speed.

The horizontal error of the projected acceleration $\delta_{acch}$ is calculated by taking into account the contribution $b_{acch}$ of the accelerometers and the attitude error $\Delta\varphi_h$.

The attitude error $\Delta\varphi_h$ is an upper limit of the roll and pitch error during a stabilized flight phase. The contribution $b_{acch}$ of the accelerometers represents an upper limit of the error of the horizontal acceleration measured by the accelerometers.

As the acceleration measured by the accelerometers in the stabilized flight phase is close to the reaction −g of the aircraft carried by the air mass with respect to gravity, the horizontal error of the projected acceleration $\delta_{acch}$ is, for example, in accordance with the equation:

$$\delta_{acch} = |b_{acch}| + g \times |-\Delta\varphi_h| \quad \text{(equation 4)}$$

where "||" means an absolute value.

The projected vertical acceleration error $\delta_{accv}$ is calculated by taking into account the contribution $b_{accv}$ of accelerometers and the influence of altitude error on the estimation of gravity. For example, the vertical acceleration error is consistent with the equation:

$$\delta_{accv} = |b_{accv}| + k_v \times vPIL \quad \text{(equation 5)}$$

where kv is a coefficient of sensitivity of gravity to altitude. The gravity sensitivity coefficient to altitude $k_v$ is close to $3 \cdot 10^{-6}$ meters per second squared per meter (m·s⁻²/m). The quantity $b_{accv}$ is an upper limit of the error of the vertical acceleration measured by the accelerometers.

During maneuvers of the aircraft, the contribution of the inertial error increases. $K_{dyn}$ is the additional error developed during the maneuvers of the aircraft. Equation 3 then becomes:

$$VIL_{inertiel} = \delta_{acc} \times \text{Tau} + K_{dyn} \quad \text{(equation 6)}$$

The $K_{dyn}$ function is defined differently for the calculation of a protection radius hVIL for a horizontal speed, and for the calculation of a protection radius vVIL for a vertical speed.

When the speed is a horizontal speed, the $K_{dyn}$ function, denoted $K_{dynh}$, in order to take into account the projection error effect of the horizontal acceleration in the presence of the error related to the geographical heading Cc, is in accordance with the equation:

$$K_{dynh} = A_h \times |\Delta\varphi_v| \times \text{Tau} \quad \text{(equation 7)}$$

where $\Delta\varphi_v$ is an upper limit of the measurement error of the geographical heading Cc during a dynamic flight phase, while $A_h$ is the amplitude of the horizontal acceleration. For example, the amplitude $A_h$ of the horizontal acceleration is equal to the square root of the sum of the squares of the accelerations Ae, An in the North-South and East-West directions.

In order to take into account the projection error effect of the horizontal acceleration in the presence of roll and pitch error, the $K_{dyn}$ function, denoted by $K_{dynv}$, for a vertical speed, is in accordance with the equation:

$$K_{dynv} = A_h \times |\Delta\varphi_h| \times \text{Tau} \quad \text{(equation 8)}$$

where $\Delta\varphi_h$ is an upper limit of the error of measurement of the roll Ro and the pitch Tan during a dynamic flight phase, while $A_h$ is the amplitude of the horizontal acceleration.

Thus, the second function $K_{dyn}$ is a function that takes into account the influence of the maneuvers of the aircraft during an unstable flight phase. In other words, the second function $K_{dyn}$ is a function of a dynamic of the trajectory of the aircraft.

Thus, the third calculation module 55 calculates the vertical reliability protection radius vVIL related to the speed according to the equation:

$$vVIL = \frac{2 \times vPIL}{Tau} + \delta_{accv} \times Tau + K_{dynv} \quad \text{(equation 9)}$$

The third calculation module 55 calculates, in addition, the horizontal reliability protection radius hVIL related to the speed according to the formula:

$$hVIL = \frac{2 \times hPIL}{Tau} + \delta_{acch} \times Tau + K_{dynh} \quad \text{(equation 10)}$$

It should be noted that the time constant Tau, and therefore the first gain K1, are likely to be different when calculating the different corrected speeds Ve, Vn, Vv.

For example, a time constant $Tau_h$ is used for the calculation of the horizontal corrected speeds Ve, Vn and of the horizontal reliability protection radius hVIL related to the associated speed, while another time constant Tauv is used for the calculation of the corrected vertical speed Vv and the associated vertical reliability protection radius vVil.

In particular, each time constant Tau is equal to the square root of a ratio between, as the numerator, a reliability protection radius hPIL, vPIL related to the measured position Pm and, as the denominator, the associated maximum error of acceleration $\delta_{accv}$, $\delta_{acch}$.

For example, the time constant $Tau_h$ for the corrected horizontal speeds Ve, Vn is in accordance with the equation:

$$Tau_h = \sqrt{2 \times hPIL / \delta acc_h} \quad \text{(equation 11)}$$

For example, the time constant $Tau_v$ is in accordance with the equation for the vertical corrected velocity Vv:

$$Tau_v = \sqrt{2 \times vPIL / \delta acc_v} \quad \text{(equation 12)}$$

The reliability protection radius values hPIL, vPIL related to the measured position Pm used during the calculation of the time constants $Tau_h$, $Tau_v$ are, for example, average values provided by the operator of the GNSS system. Similarly, the values of the maximum acceleration error $\delta_{accv}$, $\delta_{acch}$ are average values provided by the manufacturer of the inertial measurement unit 15.

The transmission of the AlarmV speed reliability alarm signal occurs when the position reliability alarm AlarmP is transmitted by the GNSS receiver. If the GNSS receiver does not transmit the alarm AlarmP for position reliability, the protection radii hPIL, vPIL related to the position correctly limit the error of the measured position Pm and the protection radii hVIL, vVIL related to the speed that are calculated from the protection radii hPIL and vPIL, and effectively limit the speed error.

If the GNSS receiver issues the position reliability alarm AlarmP, which means that the protection radii hPIL, vPIL related to the position no longer limit the error to the measured position Pm, and the protection radii hVIL and vVIL related to the speed, calculated from the protection radius hPIL, vPIL related to the position, no longer limit the speed error. In this case, the calculator 25 transmits the speed reliability alarm AlarmV to indicate to the user that the corrected speeds Vv, Vn, Ve are no longer reliable.

It should be noted that the above description has been given for the case where the inertial measurement unit 15 comprises an AHRS module. Alternatively, the acceleration inertial measurement unit 15 may comprise an IRS module. An IRS (Inertial Reference System) module is a module that is able to measure a geographical heading angle Cc. IRS modules generally require high accuracy sensors.

In this case, the calculator 25 has no correction module 30, since the IRS module is able to measure a geographical heading angle Cc without requiring correction.

The use of the correction loop 50 makes it possible to correct the speed measurements V1, V2, V3 based on the position Pm measured by the geolocation module 20 and thus prevent the speed measurements V1, V2, V3 from diverging over time.

The positioning system 10 makes it possible to calculate a corrected speed Vv, Vn, Ve with great accuracy. For example, the accuracy is better than 10 centimeters per second (cm/s) when the inertial measurement unit 15 is of the IRS type, and better than 1 m/s when the inertial measurement unit 15 is of the AHRS type.

In addition, the corrected speed Vv, Vn, Ve is reliable. In particular, the corrected speed Vv, Vn, Ve is protected by a protection radius hVIL, vVIL in the event of failures of the GNSS system.

The protection radius hVIL, vVIL depends on the type of inertial measurement unit used and the type of geolocation module used. For example, if an SBAS-compatible satellite geolocation module 20 is used, the protection radius at $10^{-6}$ per hour is better than 1 m/s when the inertial measurement unit 15 is of the IRS type, and is better than a few m/s when the inertial measurement unit 15 is of the AHRS type.

In addition, the calculation of the reliable speed Vv, Vn, Ve and the associated reliability protection radii hVIL, vVIL, is of low complexity and low in calculation requirements. The positioning system 10 is therefore likely to be implemented using inexpensive components.

The positioning system 10 is, moreover, able to be incorporated in pre-existing systems without hardware modification but only software modification, since the method of calculating the speed does not involve complex calculations. In particular, the positioning system 10 is capable of being implemented by using a calculator of an already existing synthetic vision system as the calculator 30.

The first example above was given for the case where the Tau time constants are constant, for example when they are set "off-line" during a calibration step performed on the ground.

Alternatively, the Tau time constants may be calculated in real time from the values of the reliability protection radii vPIL, hPIL related to the calculated position.

For example, the time constants Tau are calculated at each iteration of the acceleration measuring step 120, the first integration step 130, the first correction step 140, the second integration step 150 and the first estimation step 160.

The method of calculating a speed is then particularly suitable for a geolocation module 20 operating in SBAS mode.

For example, in this case, each Tau time constant lies between 10 s and 30 s if the inertial measurement unit 15 is of the AHRS type, and between 50 s and 150 s if the inertial measurement unit 15 is of the IRS type.

Figure 3:
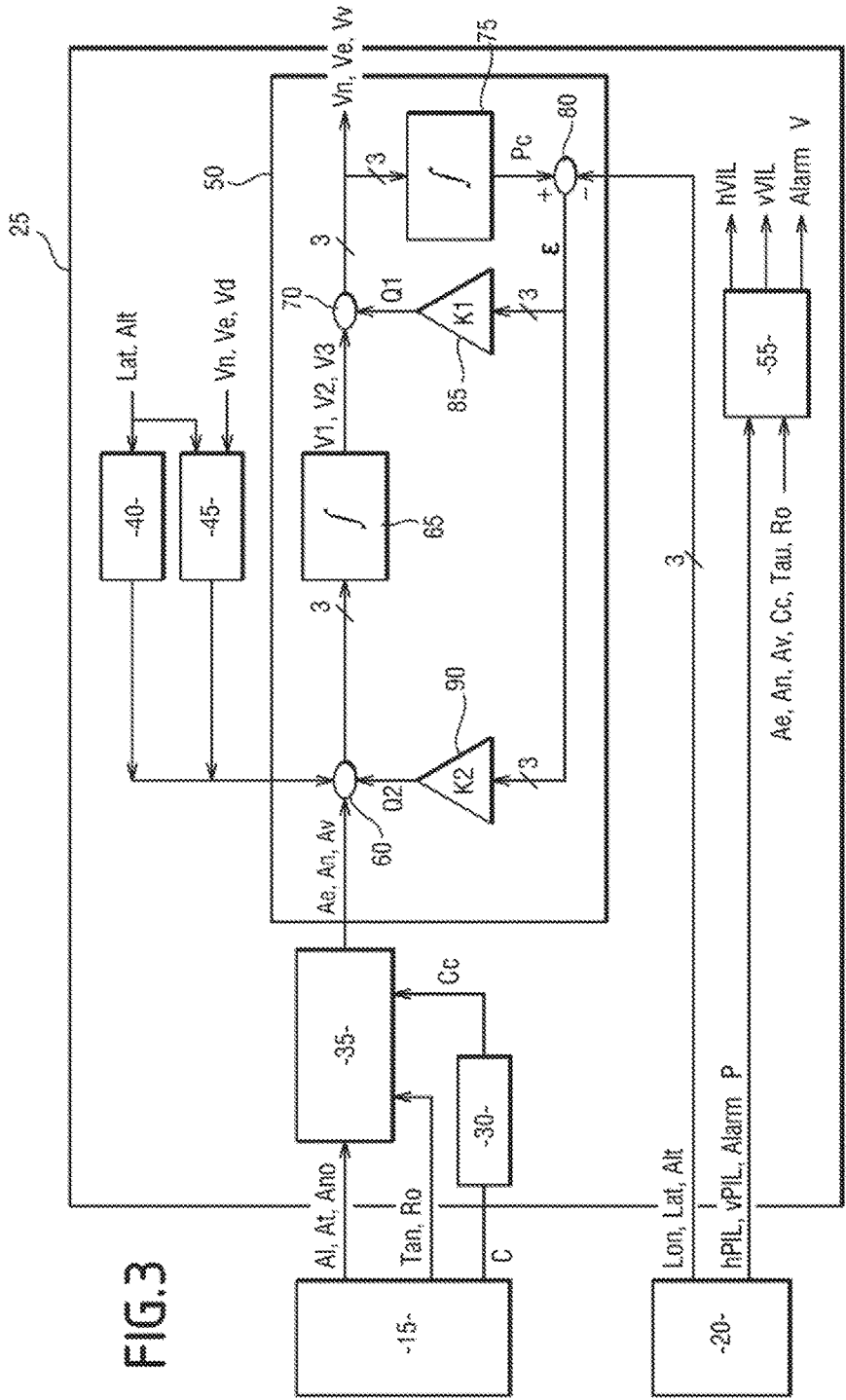
FIG. 3 shows a schematic representation of another example of a positioning system.

A second example of a positioning system 10 is shown in FIG. 3. The elements that are identical to the first example of FIG. 1 are not described again. Only the differences are highlighted.

The correction loop 50 is of the second order.

The correction loop 50 has a second multiplier 90. The second multiplier 90 has a second gain K2. The second gain K2 is constant.

The operation of the second example will now be described.

During the measurement step 120, at least one projected acceleration Ae, An, Av is corrected by a second quantity Q2.

For example, the projected acceleration An in the North-South direction, the projected acceleration Ae in the East-West direction and the projected acceleration Av in the vertical direction, are evaluated.

Each second quantity Q2 is equal to the product of the second gain K2 and the difference ε.

The second gain K2 is equal to the ratio of, for the numerator, four, and the square of the time constant Tau, for the denominator.

The first gain K1 is equal to the ratio of, for the numerator, four times a damping coefficient $\xi$ and, for the denominator, the time constant Tau.

The damping coefficient $\xi$ lies, for example, between 0.7 and 1.

The quantities $b_{acch}$, $b_{accv}$, $\Delta\varphi_h$, $\Delta\varphi_v$, used in the equations 3, 4, 7 and 8 above, no longer represent maximum errors but maximum error variations for a duration equal to the time constant Tau.

The second example of a positioning system is more accurate than the first example.

In particular, the use of a second order corrector makes it possible to correct the projected acceleration error $\delta_{acc}$, which influences the first $VIL_{inertiel}$ function.

When a second order corrector is used, the first $VIL_{inertiel}$ function is then in accordance with the equation:

$$VIL_{inertiel} = \delta_{acc}/Tau \times Tau \quad \text{(equation 13)}$$

where $\delta_{acc}$/Tau is not the maximum projected acceleration error, but the maximum variation of the projected acceleration error for a duration equal to the time constant Tau. The effect of the continuous component of the projected acceleration error is thus removed. The reliability protection radii hVIL, vVIL on the speeds are then smaller.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of calculating a reliable speed of an aircraft with respect to failures of a satellite positioning system, comprising:
    obtaining a measured speed of the aircraft from an inertial measurement unit of the aircraft;
    obtaining a measured position of the aircraft, associated with a reliability protection radius related to position, from a satellite positioning module of the aircraft;
    calculating, by a correction loop, a corrected speed, wherein the calculation of the corrected speed comprises calculating a calculated position by integration of a previously calculated corrected speed, and correcting the measured speed as a function of a difference between the calculated position and the measured position;
    calculating a reliability protection radius related to the corrected speed, equal to the sum of a contribution of a worst variation of a measured position error within a protection volume defined by the reliability protection radius related to position, and a contribution of imperfections of the inertial measurement unit; and
    controlling the aircraft based on the corrected speed and the reliability of protection radius.

2. The method of calculating a reliable speed according to claim 1, further comprising:
    measuring, by the inertial measurement unit, at least one acceleration of the aircraft in a reference frame linked to the aircraft;
    projecting each acceleration measured in a geographical reference frame to obtain at least one projected acceleration, wherein the projection is, furthermore, a function of an acceleration due to gravity; and
    integrating the projected acceleration to obtain the measured speed.

3. The method of calculating a reliable speed of an aircraft according to claim 2, wherein the calculation of a corrected speed comprises:
    correcting the projected acceleration by an amount equal to the product between a second gain, and the position difference; and
    correcting the measured speed by an amount equal to the product between a first gain and the position difference.

4. The method of calculating a reliable speed of an aircraft according to claim 3, wherein the first gain and the second gain are constant.

5. The method of calculating a reliable speed of an aircraft according to claim 2, wherein the reliability protection radius related to the corrected speed is equal to the sum of a ratio of double the reliability protection radius related to position to a time constant of the correction loop, and a first function of a maximum error of the projected acceleration.

6. The method of calculating a reliable speed of an aircraft according to claim 5, wherein the first function of the maximum error of the projected acceleration is equal to the sum of a second function and a product, wherein the second function is a function of a dynamic of the trajectory of the aircraft, while the product is a product of the maximum error of the projected acceleration and the time constant.

7. The method of calculating a reliable speed of an aircraft according to claim 6, wherein the time constant is equal to the square root of a ratio between, for the numerator, the reliability protection radius related to position and, for the denominator, the maximum error of the projected acceleration.

8. An aircraft positioning system comprising:
   an inertial measurement unit;
   a satellite positioning module;
   a calculator, wherein the calculator is configured to:
      obtain a measured speed of an aircraft from the inertial measurement unit,
      obtain a measured position of the aircraft, associated with a reliability protection radius related to position, from the satellite positioning module,
      calculate, by a correction loop, a corrected speed, wherein the calculation of the corrected speed comprises calculating a calculated position by integration of the corrected speed, and correcting the measured speed as a function of a difference between the calculated position and the measured position,
      calculate a reliability protection radius related to the corrected speed, equal to the sum of a contribution of a worst variation of a measured position error within a protection volume defined by the reliability protection radius related to position, and a contribution of imperfections of the inertial measurement unit,
      output the corrected speed and the reliability of protection radius and a flight control system in communication with the calculator and configured to:
         receive the corrected speed and the reliability of protection radius from the calculator, and
         control the aircraft based on the corrected speed and the reliability of protection radius.

9. An aircraft equipped with the positioning system according to claim 8.

10. An aircraft, comprising:
    a positioning system including:
    an inertial measurement unit, a satellite positioning module and a calculator, wherein the calculator is configured to:
       obtain a measured speed of an aircraft from the inertial measurement unit,
       obtain a measured position of the aircraft, associated with a reliability protection radius related to position, from the satellite positioning module,
       calculate, by a correction loop, a corrected speed, wherein the calculation of the corrected speed comprises calculating a calculated position by integration of the corrected speed, and correcting the measured speed as a function of a difference between the calculated position and the measured position, and
       calculate a reliability protection radius related to the corrected speed, equal to the sum of a contribution of a worst variation of a measured position error within a protection volume defined by the reliability protection radius related to position, and a contribution of imperfections of the inertial measurement unit; and
    a flight control system in communication with the positioning system and configured to:
       receive the corrected speed and the reliability of protection radius from the positioning system, and
       control the aircraft based on the corrected speed and the reliability of protection radius.

* * * * *